(12) United States Patent
Jones et al.

(10) Patent No.: US 7,790,092 B2
(45) Date of Patent: Sep. 7, 2010

(54) FLOW FILL MANUFACTURING OF SOLID INK STICKS WITH TOP SURFACE CONDITIONING

(75) Inventors: Brent Rodney Jones, Sherwood, OR (US); Gustavo J. Yusem, Tigard, OR (US); Terry Alan Smith, Aurora, OR (US); Frederick T. Mattern, Portland, OR (US); Edward F. Burress, West Linn, OR (US); Ernest Isreal Esplin, Sheridan, OR (US)

(73) Assignee: Xerox Corporation, Norwalk, CT (US)

( * ) Notice: Subject to any disclaimer, the term of this patent is extended or adjusted under 35 U.S.C. 154(b) by 511 days.

(21) Appl. No.: 11/546,084

(22) Filed: Oct. 11, 2006

(65) Prior Publication Data

US 2008/0088064 A1    Apr. 17, 2008

(51) Int. Cl.
*B29C 39/02*    (2006.01)
(52) U.S. Cl. .............. 264/400; 264/319; 264/293; 264/162; 264/446; 264/482; 425/557; 425/566; 425/588; 425/261; 425/174.4
(58) Field of Classification Search ............. 264/41.86, 264/109, 102, 409, 446, 482, 40.1; 425/566, 425/261, 74.4, 256
See application file for complete search history.

(56) References Cited

U.S. PATENT DOCUMENTS

| | | | |
|---|---|---|---|
| 3,849,241 A | 11/1974 | Butin et al. | |
| 4,271,757 A | 6/1981 | Maxwell et al. | |
| 4,340,563 A | 7/1982 | Appel et al. | |
| 4,889,560 A | 12/1989 | Jaeger et al. | |
| 4,889,761 A | 12/1989 | Titterington et al. | |
| 5,221,335 A | 6/1993 | Williams et al. | |
| 5,372,852 A | 12/1994 | Titterington et al. | |
| 5,460,757 A * | 10/1995 | Hedgecoth | .................. 264/400 |
| 5,554,334 A | 9/1996 | Kashio et al. | |
| 5,621,022 A | 4/1997 | Jaeger et al. | |
| 5,734,402 A | 3/1998 | Rousseau et al. | |
| 5,861,903 A | 1/1999 | Crawford et al. | |
| 6,267,918 B1 * | 7/2001 | Bauer | ......................... 264/400 |
| 6,284,184 B1 * | 9/2001 | Choi et al. | .................. 264/400 |
| 6,365,080 B1 | 4/2002 | Parise | |
| 6,598,954 B1 | 7/2003 | Moffat et al. | |
| 6,719,399 B2 | 4/2004 | Moffat et al. | |

(Continued)

OTHER PUBLICATIONS

Non-Final Office Action for U.S. Appl. No. 11/545,999, Mailed Jun. 15, 2009, United States Patent and Trademark Office (10 pages).

(Continued)

*Primary Examiner*—Khanh Nguyen
*Assistant Examiner*—Margaret Squalls
(74) *Attorney, Agent, or Firm*—Maginot, Moore & Beck LLP

(57) ABSTRACT

A system is provided for forming solid ink sticks comprising a molten ink delivery station for introducing molten ink material into a forming tub to form a solid ink stick. The forming tub includes an open top for receiving the molten ink material and a cavity defining a lower portion of a solid ink stick shape. The system includes a top surface conditioning station for altering the top surface of the ink material introduced into the cavity of the forming tub.

10 Claims, 12 Drawing Sheets

U.S. PATENT DOCUMENTS

| | | | |
|---|---|---|---|
| 6,869,548 | B2 | 3/2005 | Matsumoto |
| 2002/0017742 | A1* | 2/2002 | Kikuchi et al. ............... 264/333 |
| 2004/0125184 | A1 | 7/2004 | Sharma et al. |
| 2004/0176634 | A1* | 9/2004 | Titterington et al. .......... 560/19 |
| 2005/0088499 | A1* | 4/2005 | Jones et al. ................... 347/99 |
| 2008/0030559 | A1* | 2/2008 | Peters et al. .................. 347/88 |
| 2008/0087372 | A1 | 4/2008 | Jones et al. |
| 2008/0088053 | A1 | 4/2008 | Jones et al. |
| 2008/0088054 | A1 | 4/2008 | Jones et al. |

OTHER PUBLICATIONS

Amendment in Response to Non-Final Office Action for U.S. Appl. No. 11/545,999, submitted Sep. 15, 2009 (8 pages).

Non-Final Office Action for U.S. Appl. No. 11/546,102, Mailed Mar. 10, 2009, United States Patent and Trademark Office (12 pages).

Amendment in Response to Non-Final Office Action for U.S. Appl. No. 11/546,102, submitted Jun. 10, 2009 (12 pages).

Final Office Action for U.S. Appl. No. 11/546,102, Mailed Aug. 31, 2009, United States Patent and Trademark Office (13 pages).

Amendment accompanying Request for Continued Examination for U.S. Appl. No. 11/546,102, submitted Nov. 30, 2009 (14 pages).

Second Non-Final Office Action for U.S. Appl. No. 11/546,102, Mailed Dec. 28, 2009, United States Patent and Trademark Office (12 pages).

Amendment in Response to second Non-Final Office Action for U.S. Appl. No. 11/546,102, submitted Mar. 29, 2010 (9 pages).

Non-Final Office Action for U.S. Appl. No. 11/545,874, Mailed Feb. 3, 2010, United States Patent and Trademark Office (8 pages).

Amendment in Response to Non-Final Office Action for U.S. Appl. No. 11/545,874, submitted Apr. 22, 2010 (10 pages).

* cited by examiner

FLOW FILL MANUFACTURING OF SOLID INK STICKS WITH TOP SURFACE CONDITIONING

CROSS-REFERENCE TO RELATED APPLICATIONS

Reference is made to commonly-assigned copending U.S. patent application Ser. No. 11/546,102 entitled "FORGED INK STICK FABRICATION FROM IN-LINE EXTRUSION" by Jones et al., Ser. No. 11/545,999 entitled "SOLID INK STICK FABRICATION BY FIBER EXTRUSION" by Jones et al., and Ser. No. 11/545,874 entitled "SOLID INK STICK FABRICATION BY EXTRUSION, ROLL FORMING AND SWAGING" by Jones et al., each being filed concurrently herewith, the disclosures of which are incorporated herein.

TECHNICAL FIELD

This disclosure relates generally to phase change ink jet printers, the solid ink sticks used in such ink jet printers, and the methods used to fabricate such an ink stick.

BACKGROUND

Solid ink or phase change ink printers conventionally receive ink in a solid form, either as pellets or as ink sticks. The solid ink pellets or ink sticks are placed in a feed chute and a feed mechanism delivers the solid ink to a heater assembly. Solid ink sticks are either gravity fed or urged by a spring through the feed chute toward a heater plate in the heater assembly. The heater plate melts the solid ink impinging on the plate into a liquid that is delivered to a print head for jetting onto a recording medium. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al. describe exemplary systems for delivering solid ink sticks into a phase change ink printer.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes.

Ink sticks currently in use are typically manufactured with a formed tub and flow fill process. In this method, the component dyes and carrier composition are heated to their liquid state and then poured into a tub having an interior shape corresponding to the desired finished ink stick shape. The tub may also be formed with indentations and protrusions for forming keying and coding features in the ink sticks, if desired. This manufacturing method allows formation of non-linear shapes but occasionally produces peripheral shapes with poor tolerance control and poor control of stick height, or axis of fill. Inadequate height control and stress cracks may be caused by non uniform cooling, particularly with irregularly shaped ink sticks. Specifically, the outer layer of the molten ink and carrier radiate heat to the outside air and cool more quickly than the interior portions of the mixture. Therefore, protrusions from the main body of the ink material may cool more quickly and be susceptible to breaking off and cracking.

Additionally, features cannot be formed in the upper surface with this method because of the open top of the tub. Due to the open top of the forming tub, the top surface of the ink material may solidify lacking planarity or the top surface may solidify too quickly and crack. The top surface nearly always solidifies into an uncontrolled, not flat shape such that stick to stick and areas across a stick vary in height. Poor height control can allow sticks to be undesirably displaced during handling and transport and even operation of the printer or imaging device. The flow fill process has been used in spite of these limitations because it is relatively fast and cost effective.

SUMMARY

A system is provided for forming solid ink sticks comprising a molten ink delivery station for introducing molten ink material into a forming tub to form a solid ink stick. The forming tub includes an open top for receiving the molten ink material and a cavity defining a lower portion of a solid ink stick shape. The system includes a top surface conditioning station for conditioning the top surface of the ink material introduced into the cavity of the forming tub. A tub transport may be used to transport at least one forming tub from the molten ink delivery station to the top surface conditioning station. In one embodiment, the top surface conditioning station comprises a forming section. The forming section includes at least one press plate for contacting and controllably forming, which can include substantially flattening, the top surface of the ink material.

Alternatively, the top surface conditioning station is configured to form a visually recognizable symbol in the top surface of the ink material. To this end, the forming section may include a press plate for impressing the visually recognizable symbol into the top surface of the ink material. Ink would be displaced to rise into inset features of the press plate or be displaced by protruding features of the press plate. In either case ink may be so influenced while molten, semi solid or fully solidified provided the plate is withdrawn when the upper formed crust solidifies sufficiently to retain the symbol. In another embodiment, the top surface conditioning station or a marking station comprises a laser writing station including a laser for providing a laser beam for ablating the visually recognizable symbol into the top surface of the material in the forming tubs.

The systems described herein enable a method to be performed that facilitates the formation of solid ink sticks. The method comprises introducing molten ink material into a cavity of a forming tub and conditioning the top surface of the ink material introduced into the cavity of the forming tub at a top surface conditioning station. The conditioning the top surface step may further comprise pressing a plate into the top surface of the ink material to apply pressure as appropriate to the ink consistency at the time of forming and controllably form the top surface in order to achieve desired shape, promote height control and enable marking.

The method may further comprise forming a visually recognizable symbol in the top surface of the ink material. To this end, the conditioning the top surface step may comprise impressing the visually recognizable symbol into the top surface of the ink material using a press plate. Alternatively, forming a visually recognizable symbol in the top surface of the ink material may comprise ablating the visually recognizable symbol into the top surface of the ink material using a laser writer or otherwise marking the top surface with a visually recognizable symbol.

The systems and methods, described in more detail below, enable the formation of a solid ink stick that has good height control and top surface planarity, as well as the ability to form the top surface with visually recognizable symbols and additional keying, alignment and orientation features. Other benefits and advantages of the system for forming solid ink sticks will become apparent upon reading and understanding the following drawings and specification.

DETAILED DESCRIPTION OF THE PREFERRED EMBODIMENT

Figure 1:
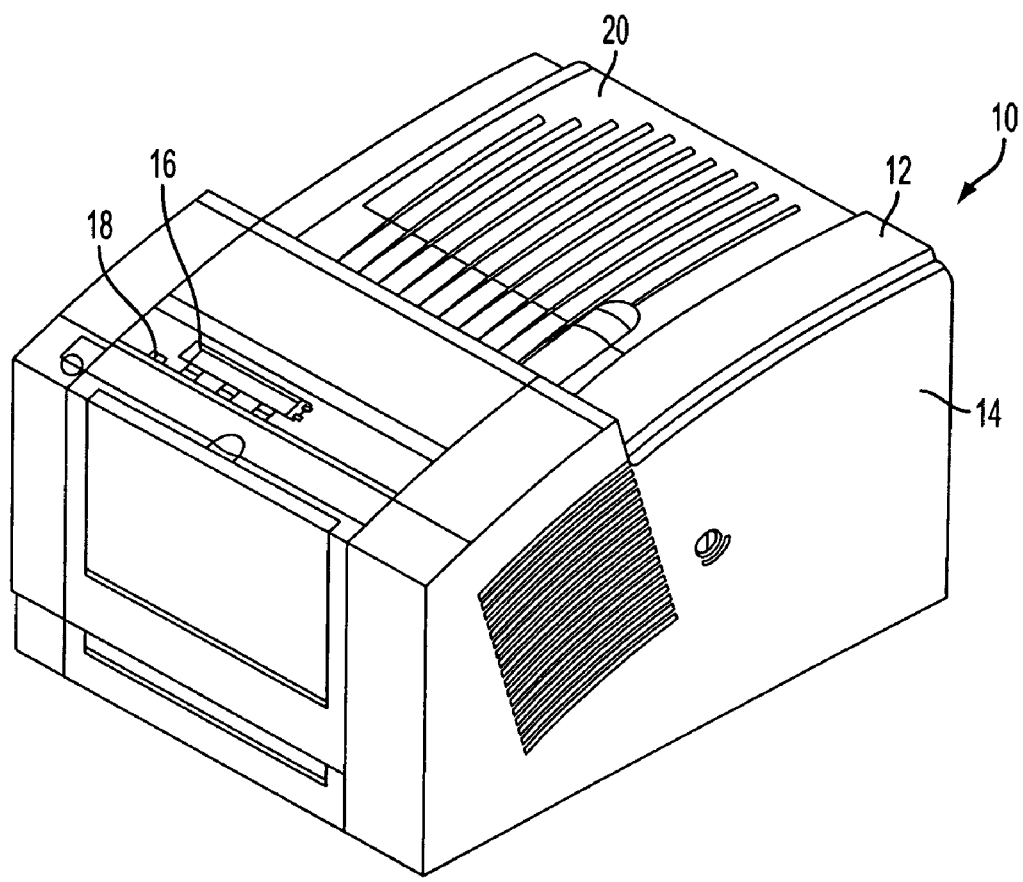
FIG. 1 is a perspective view of a phase change printer with the printer top cover closed.

For a general understanding of the present embodiments, reference is made to the drawings. In the drawings, like reference numerals have been used throughout to designate like elements.

Figure 2:
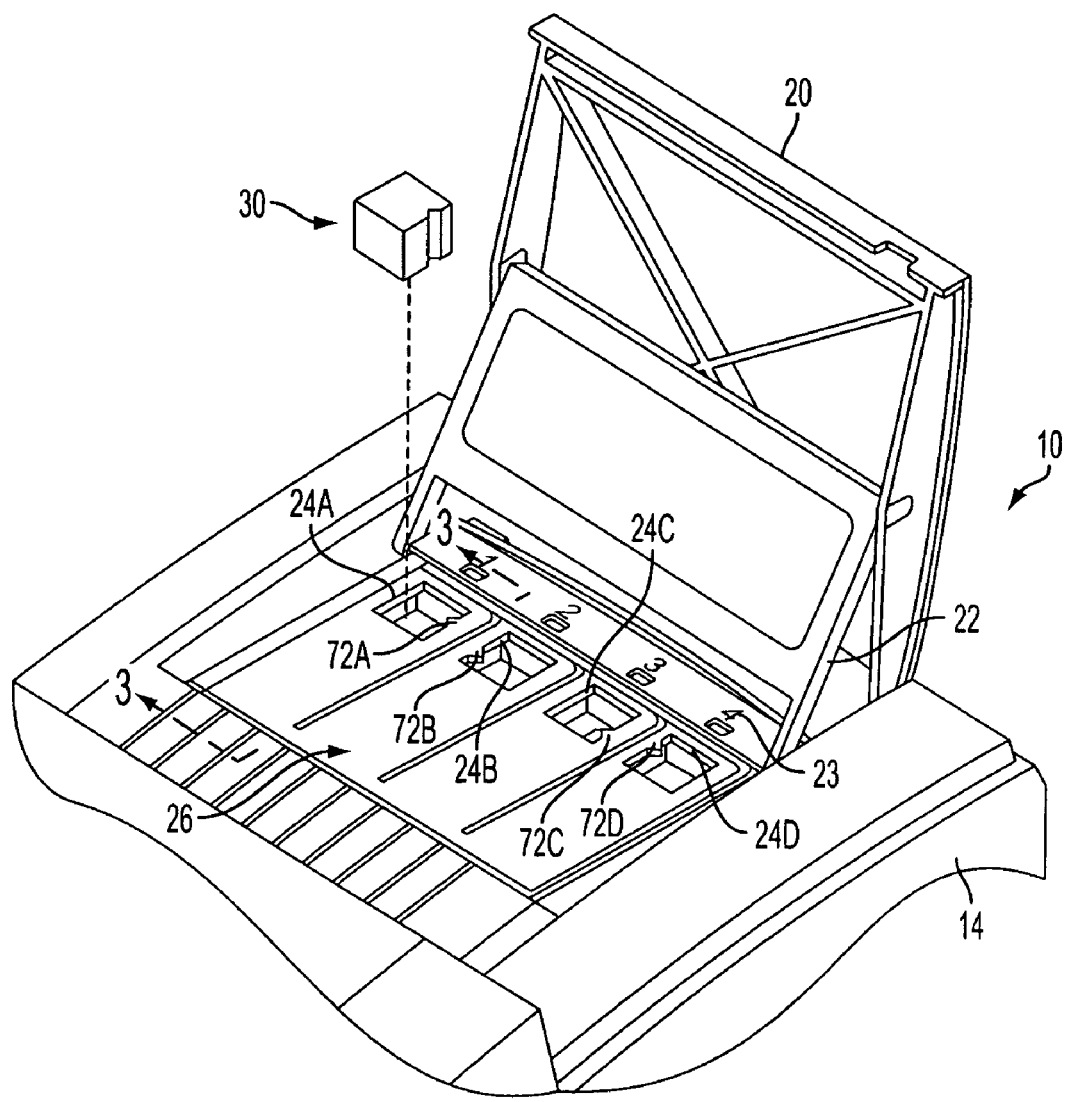
FIG. 2 is an enlarged partial top perspective view of the phase change printer with the ink access cover open, showing a solid ink stick in position to be loaded into a feed channel.

FIG. 1 shows a solid ink, or phase change, ink printer 10 that includes an outer housing having a top surface 12 and side surfaces 14. A user interface display, such as a front panel display screen 16, displays information concerning the status of the printer, and user instructions. Buttons 18 or other control elements for controlling operation of the printer are adjacent the user interface window, or may be at other locations on the printer. An ink jet printing mechanism (not shown) is contained inside the housing. An ink feed system delivers ink to the printing mechanism. The ink feed system is contained under the top surface of the printer housing. The top surface of the housing includes a hinged ink access cover 20 that opens as shown in FIG. 2, to provide the user access to the ink feed system.

In the particular cover embodiment shown, the ink access cover 20 is attached to an ink load linkage 22 so that when the ink access cover 20 is raised, the ink load linkage 22 slides and pivots to an ink load position. Opening the ink access cover 20 reveals a key plate 26 having keyed openings 24. The keyed openings provide access to a feed chute comprising several individual feed channels, represented by exemplary feed channel 28A. Each keyed opening provides access to an insertion end of one of the several individual feed channels of the solid ink feed system. A color printer typically uses four colors of ink (black, cyan, magenta, and yellow). Each color corresponds to one of the feed channels. In the illustrated embodiment, the key plate has four keyed openings 24A, 24B, 24C, and 24D. Each keyed opening 24A, 24B, 24C, 24D of the key plate 26 has a unique shape. The ink sticks 30 of the color for that feed channel have a shape corresponding to the shape of the keyed opening 24. For example, the lateral sides of the key plate openings and the lateral sides of the ink sticks may have corresponding shapes. The keyed openings and corresponding ink stick shapes are designed to ensure that only ink sticks of the proper color are inserted into each ink stick feed channel. A visually recognizable symbol 23, such as a numeral, can be applied to or formed in the housing adjacent the keyed opening. This visually recognizable symbol aids the printer user in identifying particular keyed openings and their corresponding feed channels.

Figure 3:
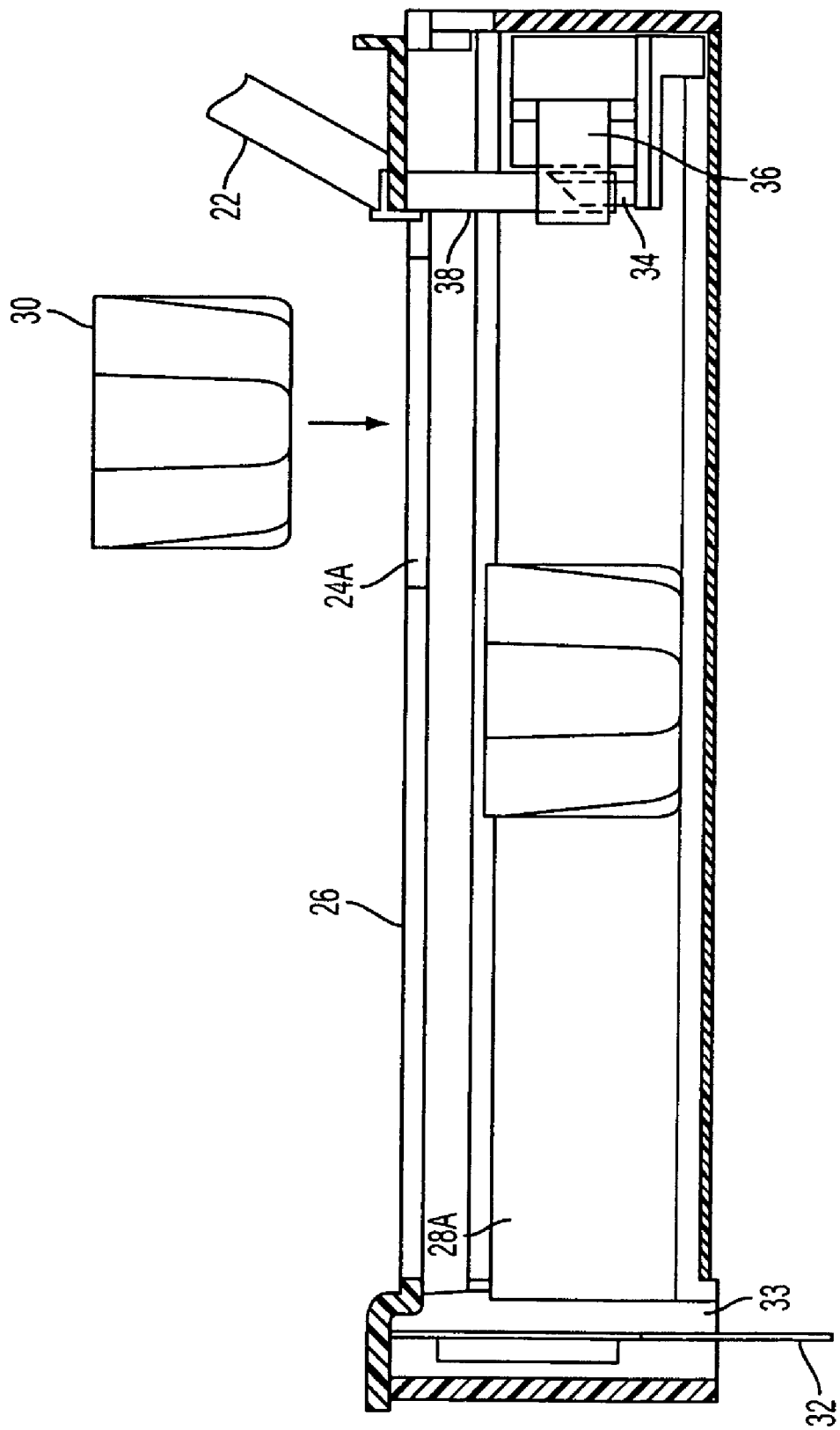
FIG. 3 is a side sectional view of a feed channel of a solid ink feed system taken along line 3-3 of FIG. 2.

Referring to FIG. 3, each feed channel, such as representative feed channel 28A, is a longitudinal feed channel designed to deliver ink sticks 30 of a particular color to a corresponding melt plate 32. Although the first feed channel 28A is shown in FIG. 3, all the feed channels are identical for purposes of the following description. Each feed channel in the particular embodiment illustrated includes a push block 34 driven by a constant force spring 36 to push the individual ink sticks 30 along the length of the longitudinal feed channel toward the melt plates 32 that are at the melt end of each feed channel. In the embodiment illustrated, the constant force spring 36 can be a flat spring with its face oriented along a substantially vertical axis.

The feed channel has a longitudinal dimension from the insertion end to the melt end, and a lateral dimension, substantially perpendicular to the longitudinal dimension. The feed channel receives ink sticks inserted at the insertion end. The feed channel has sufficient longitudinal length that multiple ink sticks can be inserted into the feed channel. Each feed channel delivers ink sticks along the longitudinal length or feed direction of the channel to the corresponding melt plate at the melt end of the feed channel. The melt end of the feed channel is adjacent the melt plate. The melt plate melts the solid ink stick into a liquid form. The melted ink drips through a gap 33 between the melt end of the feed channel and the melt plate, and into a liquid ink reservoir (not shown).

Figure 4:
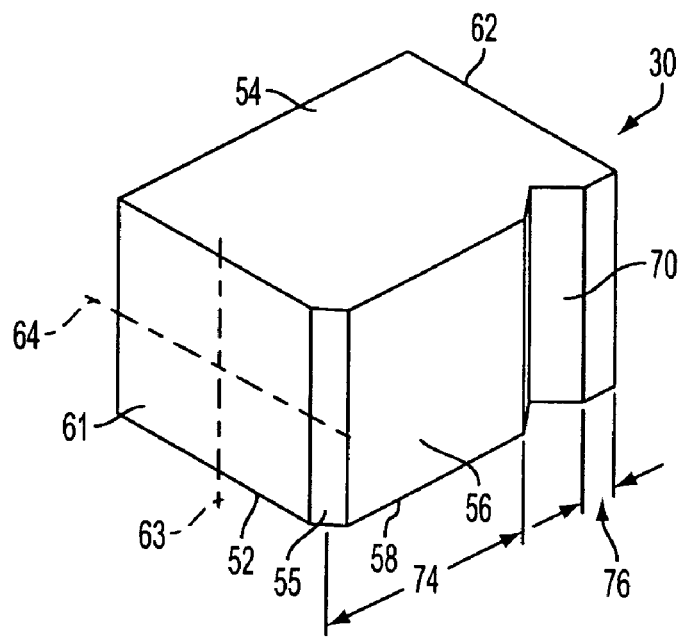
FIG. 4 is a perspective view of an embodiment of a solid ink stick.

An exemplary solid ink stick 30 for use in the feed system is illustrated in FIG. 4. The ink stick is formed of a three dimensional ink stick body. A substantially cubic ink stick body is illustrated in FIG. 4. The ink stick body illustrated has a bottom, represented by a general bottom surface 52, and a top, represented by a general top surface 54. The top and bottom surfaces are shown substantially parallel one another.

However, the surfaces of the ink stick body need not be flat, nor need they be parallel or perpendicular one another. Nevertheless, these descriptions will aid the reader in visualizing, even though the surfaces may have three dimensional topography, or be angled with respect to one another. The ink stick body also has a plurality of side extremities, such as side surfaces 56, 61, 62. The illustrated embodiment includes four side surfaces, including two end surfaces 61, 62 and two lateral side surfaces 56. The lateral side surfaces 56 are substantially parallel one another, and are substantially perpendicular to the top and bottom surfaces 52, 54. The end surfaces 61, 62 are also substantially parallel one another, and substantially perpendicular to the top and bottom surfaces, and to the lateral side surfaces. The ink stick is configured to fit into the feed channel of the feed channel with the two lateral side surfaces 56 of the ink stick body oriented along the longitudinal feed direction of the feed channel. With the substantially cubic ink stick shape illustrated, the end surfaces are thus oriented along the transverse or lateral dimension of the feed channel. One of the end surfaces 61 is a front or leading end surface, and the other end surface 62 is a rear or trailing end surface. The bottom surface has lateral edges 58 at which the bottom surface 52 intersects the lateral side surfaces 56.

The outermost lateral dimension of the ink stick body is typically only fractionally smaller than the lateral dimension of the ink stick feed channel 28A. For example, the ink stick body may have a longitudinal dimension between the end surfaces, including keying features, of between approximately 0.8 and 2.0 inches (20-51 mm), such as 1.2 inch (30 mm). The ink stick body may have a lateral dimension between the lateral extremities of between approximately 1.0 and 2.0 inches (25-51 mm), such as 1.5 inch (38 mm). The ink stick body may have a vertical dimension between the top and bottom surfaces of between approximately 0.8 and 1.6 inches (20-41 mm), such as 1.3 inches (34 mm). The lateral dimension of the ink stick feed channel may be approximately 0.004 to 0.2 inches (0.1-5.0 mm) wider than the lateral dimension of the ink stick body. Thus, the ink stick body remains substantially upright in the feed channel. Configurations described are representative of historical ink sticks but the trend is toward larger sizes and greater aspect ratios so these are to be taken as examples only.

The ink stick body may have an outer perimeter that is substantially horizontal around the largest horizontal cross section of the ink stick body. In the ink stick embodiment illustrated in FIG. 4 in which the side surfaces are substantially vertical, the outer perimeter is substantially uniform from the bottom surface to the top surface of the ink stick body. In the ink stick embodiment illustrated in FIG. 5, the horizontal outer perimeter substantially corresponds with the top surface 54 of the ink stick body. The outermost lateral side portions 56A of the ink stick body form longitudinal ink stick body perimeter segments that extend substantially parallel with the longitudinal feed direction of the feed channel when the ink stick is inserted into the feed channel. After considering the present disclosure, those skilled in the art will recognize that the outermost longitudinal segments of the perimeter can be in different positions along the height of the ink stick body. The perimeter longitudinal segment on one of the lateral side surfaces can even be at a different height than the perimeter longitudinal segment on the other lateral side surface.

Figure 5:
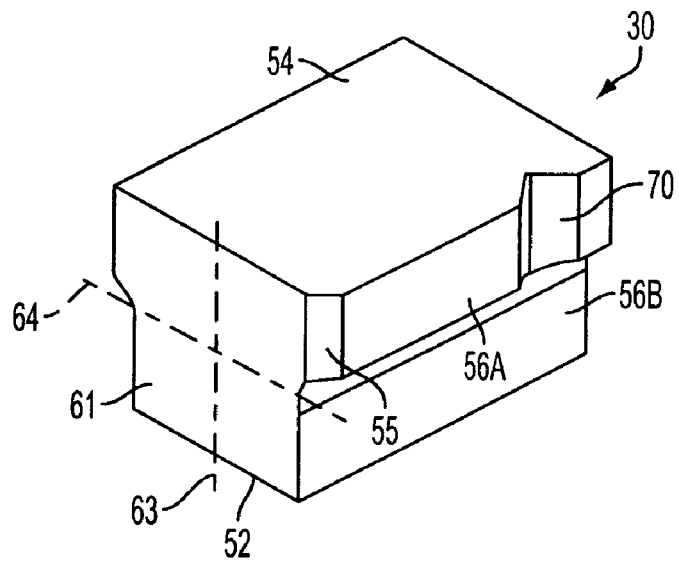
FIG. 5 is a perspective view of another embodiment of a solid ink stick.

The top view of the ink sticks shown in FIGS. 4 and 5 have a perimeter that conforms to the shape of one of the keyed openings 24 of the ink loader depicted in FIG. 2. The ink stick body includes a key element 70 of a particular predetermined size, shape, and location on the outer perimeter of the ink stick body. In the particular examples illustrated, the ink stick key element 70 is formed in the longitudinal perimeter segment formed by the outermost portion of the lateral side surface. For an ink stick of a particular color, the ink stick key element 70 matches a complementary key 72 formed in the perimeter of the keyed opening 24 in the key plate. Each color for a printer has a unique arrangement of one or more key elements in the outer perimeter of the ink stick to form a unique cross-sectional shape for that particular color ink stick. The combination of the keyed openings 24 in the key plate 26 and the keyed shapes of the ink sticks 30 (formed by the key elements 70) ensure that only ink sticks of the proper color are inserted into each feed channel. A set of ink sticks is formed of an ink stick of each color, with a unique key arrangement for ink sticks of each color.

In the ink stick embodiments shown in FIGS. 4 and 5, the key element 70 is a vertical recess or notch formed in one of the lateral side surfaces 56 of the ink stick body. The corresponding complementary key 72 on the perimeter of the keyed opening 24 is a complementary protrusion into the opening. An inwardly directed key element, such as a notch, in the ink stick body provides improved ability to exclude incorrect ink sticks. Only an ink stick with a recess of that particular shape, location, and size (or larger) fits through the keyed opening in the key plate having a key consisting of a corresponding protrusion from the edge of the keyed opening. In addition, a recessed key element on the ink stick body allows much of the lateral side surfaces 56 of the ink stick body to be substantially flat. In particular, the sections of the lateral side surfaces 56 adjacent the corners with the end surfaces 61, 62 of the ink stick body can be flush with one another, and be the outermost lateral portions of the lateral side surface. The outermost lateral portions of the lateral side surfaces are the portions that tend to interact with the side walls of the feed channel that form the feed channel. Having the end sections of the lateral side surfaces as the outermost portions of the ink stick provides balance to help the ink stick retain its proper orientation as it moves through the feed channel. The key element extends at least approximately 0.16 inch (4 mm) into the ink stick body.

In the embodiment illustrated in FIG. 4, with a substantially flat lateral side surface extending from the bottom surface to the top surface, the key element 70 extends along the entire height of the lateral surface. The ink stick can pass through the keyed opening having a protrusion at a corresponding position of the keyed opening. The embodiment of FIG. 5 has the key element extend only along the portion of the lateral side surface 56A of the wider portion of the ink stick. In this embodiment, the corresponding key 72 on the keyed opening 24 of the key plate 26 does not extend far enough into the opening to require that the key element 70 be included in the narrower portion of the ink stick body.

The key element 70 on the ink stick body has a particular position with respect to the other perimeter segment of the ink stick body. For example, the key element has a particular spatial relationship with respect to the edges at which the perimeter segment containing the key element intersects other perimeter segments of the ink stick body. In further particularity, the key element 70 on the side surface 56 has a particular position with other surfaces of the ink stick body, such as the end surfaces 61, 62. The ink stick key element is located a leading distance 74 from the leading end surface 61 of the ink stick body, and a trailing distance 76 from the trailing end surface 62 of the ink stick body. In the embodiments illustrated in FIGS. 4 and 5, the leading distance 74 is substantially greater than the trailing distance 76. For example, the leading distance may be three times the trailing distance.

Figure 6:
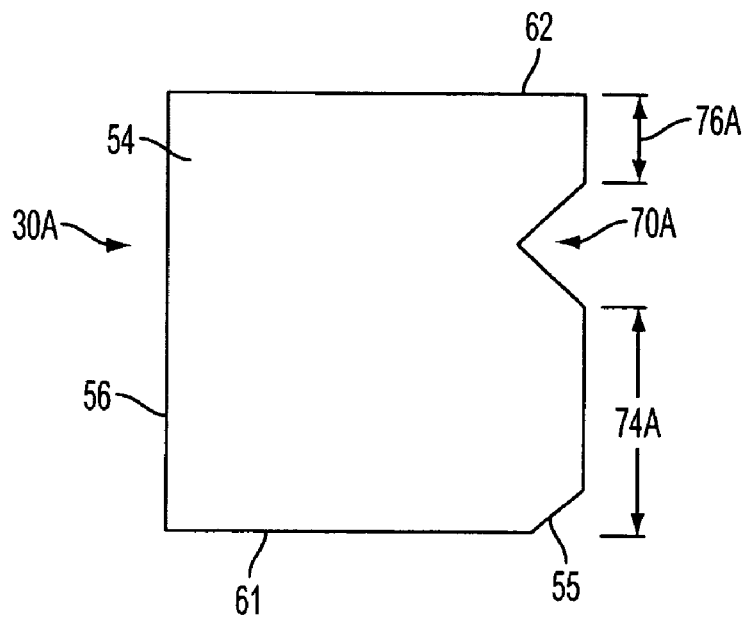
FIG. 6 is a top elevational view of the solid ink stick of FIG. 4.
Figure 7:
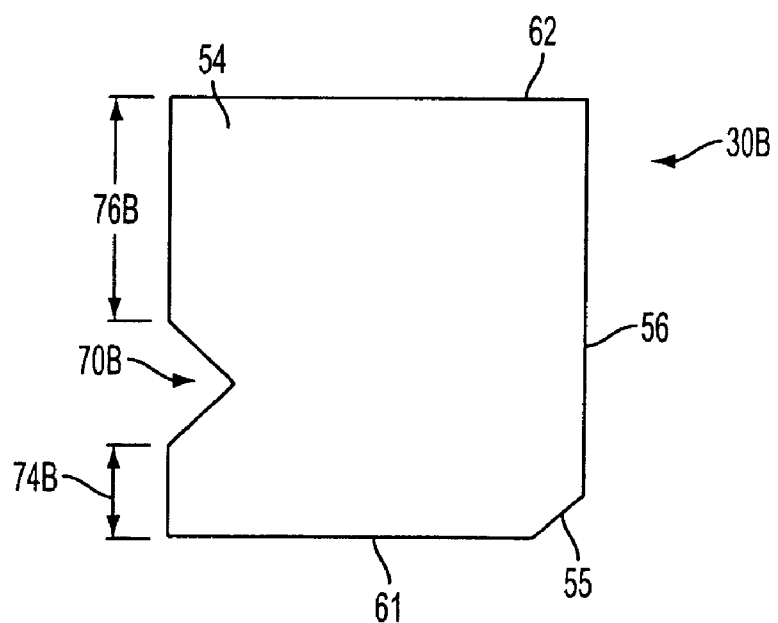
FIG. 7 is a top elevational view of another solid ink stick.
Figure 8:
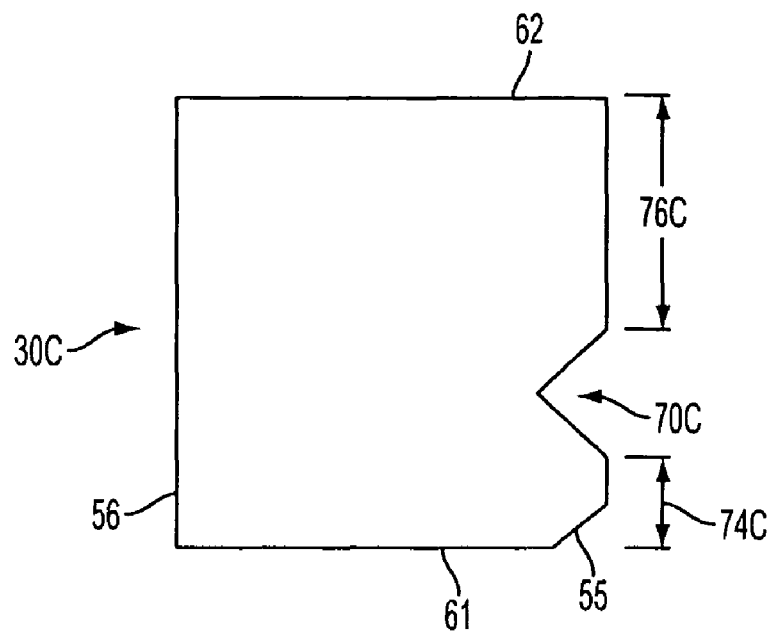
FIG. 8 is a top elevational view of another solid ink stick.
Figure 9:
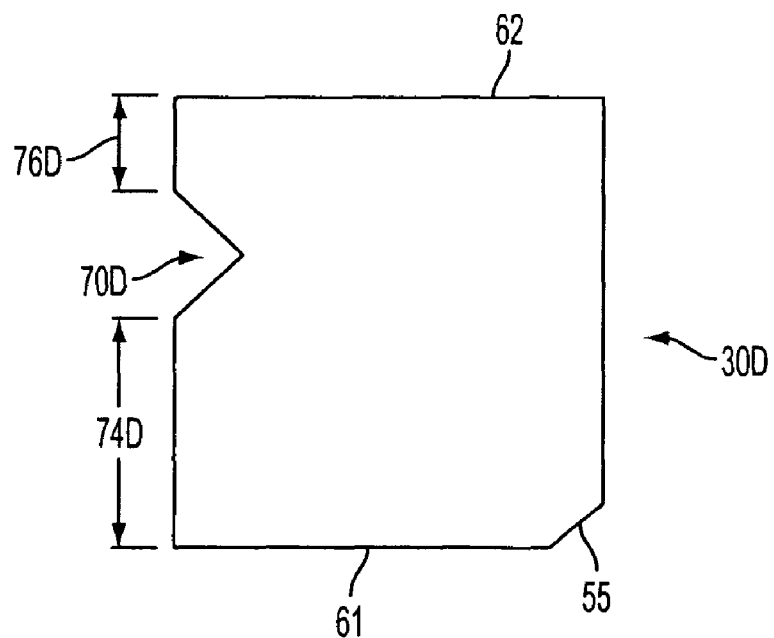
FIG. 9 is a top elevational view of another solid ink stick.

FIG. 6 is a top view of the ink stick of FIG. 4. A top view of the ink stick of FIG. 5 is identical. FIGS. 7, 8, and 9 are top views of ink sticks that may be included in a multi-color set of ink sticks for use in the printer shown in FIGS. 1-3. As can be seen by comparing ink stick shapes of FIGS. 6, 7, 8, and 9 with the keyed openings 24 of the key plate visible in FIG. 2, a set of ink sticks provides a unique one-to-one match between a particular color ink stick and the keyed openings providing access to the four ink stick feed channels. Such one-to-one match is provided by including a key element 70 of a single predetermined size and shape at different locations around the outer perimeter of the ink stick body. For example, an ink stick with the key element 70A positioned as shown in FIG. 6 can be inserted into the first keyed opening 24A in the key plate shown in FIG. 2, but cannot be inserted into any of the other keyed openings 24B, 24C, 24D. The keys 72B, 72C, 72D in the keyed openings 24B, 24C, 24D of the key plate and corresponding to the key element positions shown in the ink sticks 30B, 30C, 30D of FIGS. 7, 8, and 9 block the ink stick 30A of FIG. 6. The ink stick 30B having the key element 70B positioned as shown in FIG. 7 can be inserted into the second keyed opening 24B of the key plate shown in FIG. 2, but not into the other keyed openings 24A, 24C, 24D. The ink sticks having the key elements 70C, 70D positioned as shown in FIGS. 8 and 9 (respectively) can be inserted into and only into the third and fourth key openings 24C, 24D, which correspond to the third and fourth ink stick feed channels. Thus, the key elements 70A, 70B, 70C, 70D provide discrimination among the different feed channels to stop the user from inserting an ink stick into the incorrect ink stick feed channel.

The key elements 70A, 70B, 70C, 70D are of substantially the same size and shape as one another, but are in different positions around the perimeter of the ink stick body. The key element 70C in the third ink stick 30C is formed in the same lateral side surface 56 as the key element 70A in the first ink stick 30A. The leading distance 74C from the leading end surface 61 to the key element 70C of the third ink stick 30C, however, is significantly greater than the trailing distance 76C from the key element 70C to the trailing end surface 62. For example, the ratio of the leading distance 74C to trailing distance 76C for the third ink stick 30C may be the inverse of the ratio of the leading distance 74A to trailing distance 76A for the first ink stick 30A. More than one key element 70 may be included on a side surface 56 of the ink stick body. In particular, at least some of the key elements are on different sides of the ink stick horizontal perimeter. Thus, the key element 70A of the first ink stick is on a first section of the perimeter, while the key element 70B of the second ink stick is on a second section of the perimeter. The first and second sections of the perimeter do not correspond or align with one another when the first and second ink sticks 30A, 30B are aligned with one another.

An orientation feature 55 in each ink stick is useful to prevent erroneous ink insertion when the key element patterns (size and position) are symmetrical. The orientation feature illustrated is a corner notch in each ink stick. Referring to FIGS. 6 and 7, the orientation feature prohibits incorrect insertion of the first ink stick 30A into the second keyed opening 24B if the leading distance 74A and trailing distance 76A of the first ink stick are the same as the trailing distance 76B and leading distance 74B of the second ink stick. Those skilled in the art will identify numerous other types and configurations of features to ensure that ink sticks are inserted into the key opening with the correct orientation. For example, the orientation feature may be provided by positioning the key elements 70 so that the leading and trailing distances on different ones of the ink sticks are not symmetrical. Referring to the ink sticks shown in FIGS. 6 and 7, the orientation feature can be provided by having the leading distance 74A of the first ink stick 30A differ from the trailing distance 76B of the second ink stick 30B and the trailing distance 76A of the first ink stick 30A may differ from the leading distance 74B of the second ink stick 30B.

The common shape and size of the key elements for the ink sticks of a particular set of ink sticks for a printer facilitates manufacture of the ink sticks, and enhances the "family" appearance of the set of ink sticks for that particular printer. Different shapes and/or sizes of key elements may be used to differentiate ink sticks intended for different models of printers. For example, one printer could use triangular ink stick key elements 70. A different printer model could use semicircular ink stick key elements (not shown). Yet a different printer model could use rectangular ink stick key elements (not shown). The ink stick key elements need not all be formed in the longitudinal perimeter segments formed on the lateral side surfaces of the ink stick body. Key elements may also be formed in perimeter segments of the ink stick body that are at least partially in the transverse longitudinal feed direction. For example, key elements may be formed in the perimeter segments formed by the outermost portions of the end surfaces 61, 62 of the ink stick body. Feed keying elements may be formed in sides or the bottom surface such that they are parallel to the feed direction of the ink sticks in a loader.

Figure 10:
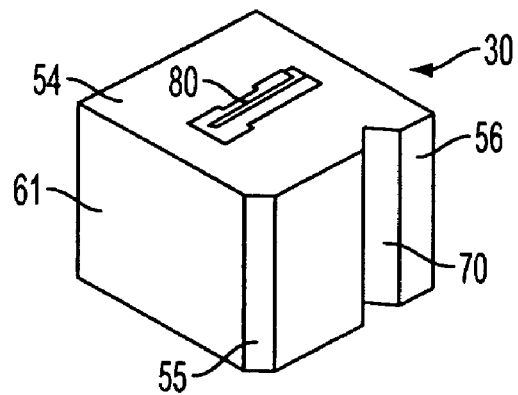
FIG. 10 is a perspective view of another embodiment of a solid ink stick.
Figure 11:
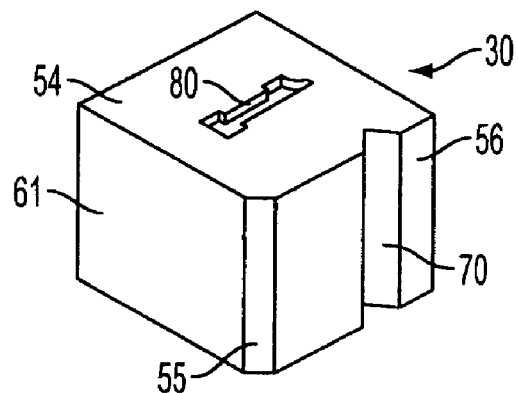
FIG. 11 is a perspective view of another embodiment of a solid ink stick.
Figure 12:
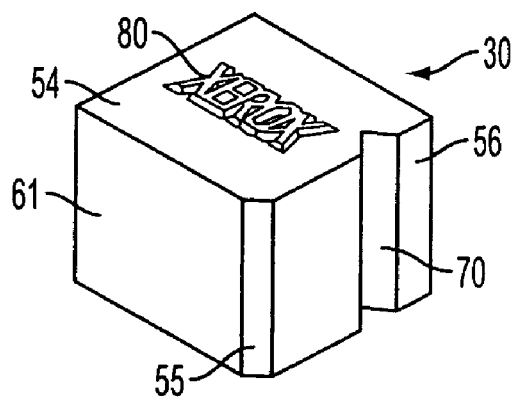
FIG. 12 is a perspective view of another embodiment of a solid ink stick.
Figure 13:
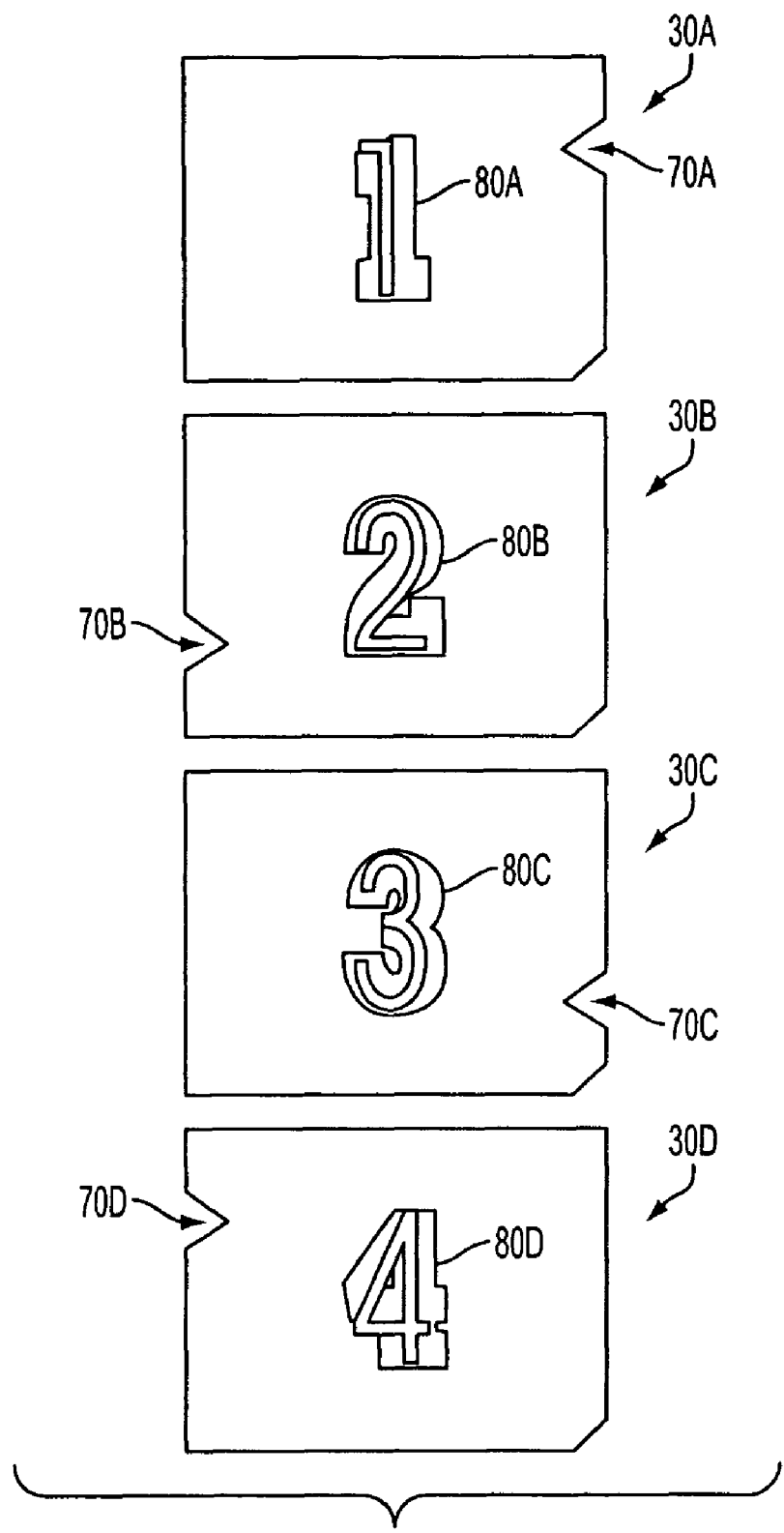
FIG. 13 is a top elevational view of a set of solid ink sticks.

An additional feature that reduces the possibility of incorrectly inserting an ink stick of one color into the feed channel intended for a different color is to include a visually recognizable symbol or mark 80 on the substantially horizontal top surface 54 of the ink block, as shown in FIGS. 10, 11, and 12. A visually recognizable symbol is a mark that conveys meaning to, or is easily recognizable by, a printer user. For maximum visibility, the visually recognizable symbol 80 is formed on the surface of the ink stick body with a vertical dimension, so it is three dimensional. For example, the symbol 80 may be raised or embossed on the top surface, as shown in FIG. 10. The symbol could alternatively be impressed or debossed into the horizontal top surface of the ink stick block, as shown in FIG. 11. Referring to FIG. 13, a set of ink sticks for the printer shown in FIGS. 1-3 has the ink stick of the appropriate color identified with an alphanumeric character 80A, 80B, 80C, 80D corresponding to the particular keyed opening 24A, 24B, 24C, 24D leading to the appropriate feed channel for that particular color of ink. The visually recognizable symbol 80 on the ink stick may match the visually recognizable symbol 23 adjacent the corresponding keyed opening. An ink stick 30A with a key element 70A as shown in FIG. 6 for fitting through the first keyed opening 24A of the key plate is marked with, for example, the visually recognizable numeral "1." An ink stick 30B with a key element 70B as shown in FIG. 7 for fitting through the second keyed opening 24B of the key plate is marked with the visually recognizable numeral "2." Ink sticks 30C, 30D with key elements 70C, 70D as shown in FIGS. 8 and 9 for fitting through the third and fourth keyed openings 24C, 24D of the key plate are marked with the visually recognizable numerals "3" and "4" respectively. Alternatively, the three dimensional visually recognizable symbol 80 could be a letter indicating the color of the ink stick (i.e., "C" for cyan, "M" for magenta, "Y" for yellow, and "K" for black). Other symbols that convey meaning or that can be matched with symbols may be used. For distinguishing among feed channels (and their corresponding keyed openings), in some instances only a portion of the symbol need differ between ink sticks of an ink stick set. The visually recognizable symbol 80 may be formed on any of the surfaces of the ink stick body. If the visually recognizable symbol is formed on the top surface 54 of the ink stick body, the symbol aids the user in orienting the ink for insertion through the insertion keyed openings, and remains visible to the printer user as the user inserts the ink stick through the opening 24 of the key plate 26. More than one symbol may be desired on each ink stick. For example, an arrow or alphanumeric logo could further increase the ease of correctly orienting the ink stick for insertion through the opening 24.

FIG. 12 shows that additional information besides the identification of the correct ink stick keyed opening may be provided on one or more of the surfaces of the ink stick body. An example is shown in which the visually recognizable symbol or mark 80 comprises the brand name of the ink sticks, which is formed in the substantially horizontal upper surface of the ink stick body. Visually recognizable characters are either embossed or debossed in the ink stick body surface to provide a three dimensional presentation of information. Visually recognizable symbols that convey meaning, such as alphanumeric characters, may provide a variety of information, such as the printer model for which the ink sticks are intended, or additional color information. Such symbols reduce the likelihood of a printer user inserting ink sticks into the incorrect model printer. Symbols may be made visible on an ink stick surface in ways other than embossing or debossing, such as by using color, texture or reflectivity variations.

Figure 14:
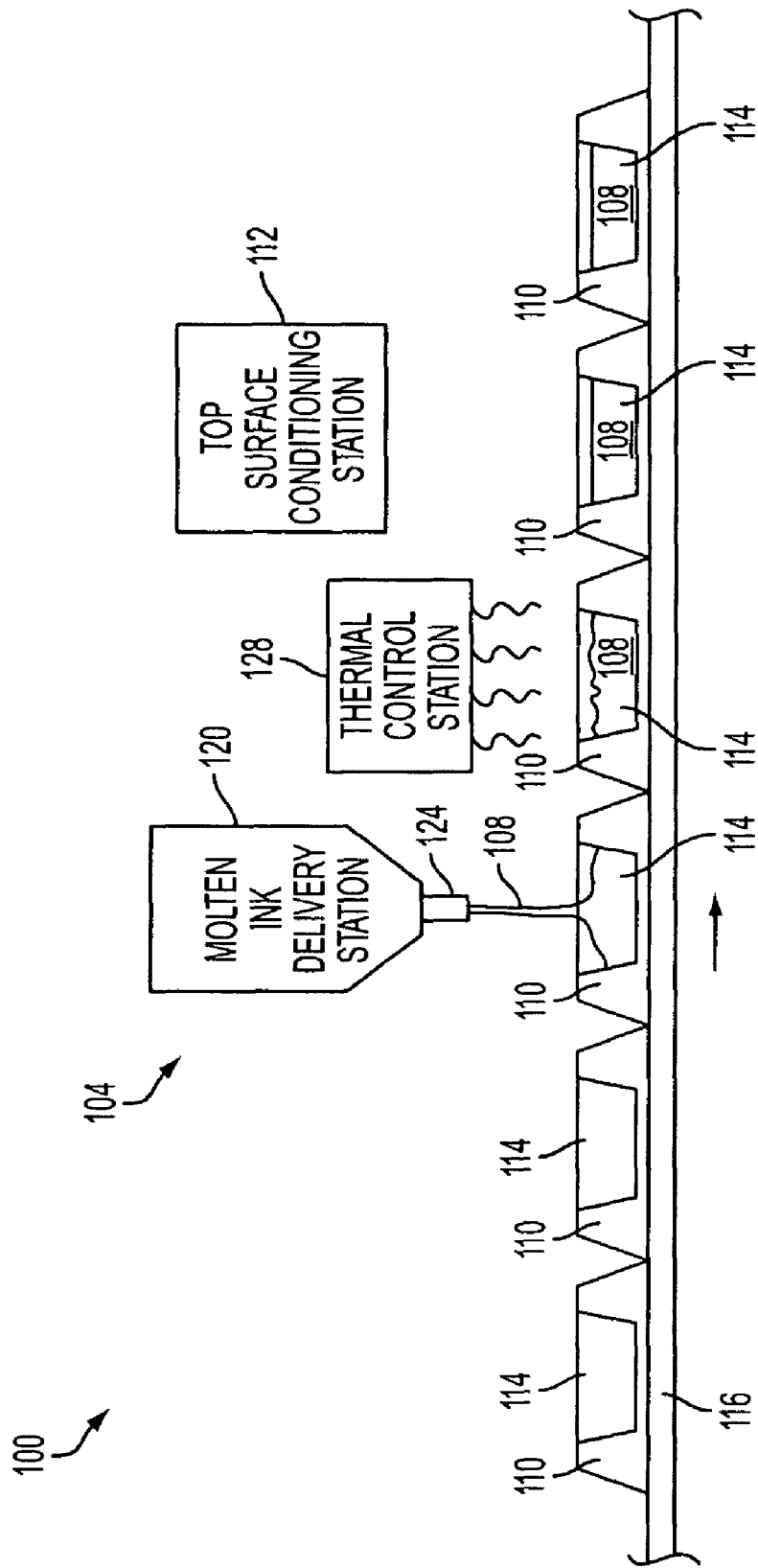
FIG. 14 is a schematic view of a system for forming solid ink sticks comprising a molten ink delivery station, a top surface conditioning station and a tub transport.

The foregoing description should be sufficient for purposes of illustrating the general operation of a phase change ink jet printer and the solid ink sticks utilized by such printers. Referring now to FIG. 14, there is shown an exemplary schematic diagram of a system 100 operable to form the exemplary ink sticks as shown in FIGS. 10-13. The system 100 includes a molten ink delivery station 104 for introducing molten ink material 108 into a forming tub 110 to form a solid ink stick; a top surface conditioning station 112 for altering a surface of the ink material 108 introduced into a cavity 114 of the forming tub 110; and a tub transport 116 for transporting at least one forming tub 110 at least from the molten ink delivery station to the top surface conditioning station. For ease of visualization, naming the specific stations and progressive movement will be described for the method of filling and forming of the ink stick as though they are in different locations, however, it is to be understood that the station in which the tub is filled could also be where forming, heating/cooling and/or marking occurs. The various actions and mechanisms could be arranged and articulated to accomplish the various steps in only one station or any number of stations.

Figure 15:
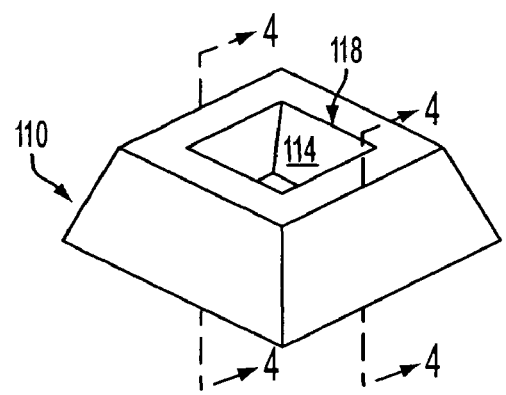
FIG. 15 is a perspective view of a forming tub of FIG. 14.
Figure 16:
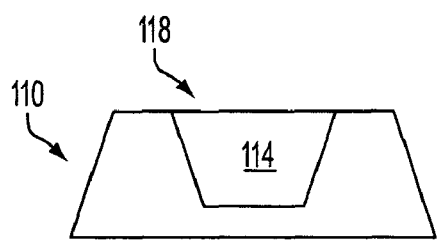
FIG. 16 is a cross-sectional view of a forming tub taken along lines 4-4 of FIG. 15.

As shown in FIGS. 15 and 16, the forming tub 110 has an open top 118 through which molten ink material may be fed and a cavity 114 below the open top 118 having an internal shape corresponding to the desired shape of the side surfaces and bottom surface of a solid ink stick. In the embodiments shown, the open top 118 encompasses the entire top of the forming tub 110, but, in another embodiment, the open top may span only a portion of the top of the forming tub. The interior of the cavity 114 may be designed to produce any desired configuration of the lower portion of a solid ink stick. Moreover, the cavity 114 may include protrusions, indentations and/or visually recognizable symbols formed in predetermined locations in the cavity 114 in order to impart keying and orientation features to the side surfaces and bottom surface of the ink material in addition to giving the ink material its general shape. The top of the ink in the tub need not be oriented upward as the top of the ink stick in actual use.

The forming tub 110 may be constructed of any suitable material, for example a rigid material with good mechanical strength. Where rapid cooling is desired, a material with high thermal conductivity and/or a desired coefficient of thermal expansion may be used. The forming tub 110 may comprise a material selected from metals and their alloys (for example, aluminum, brass and other copper alloys, steels including carbon and stainless steel), sintered forms of metals or metal composites, non-metallic materials such as ceramics, composites, and thermosetting plastics in porous or foamed forms. The forming tub may include a foil or plastic liner or film (not shown) that is compatible with the stick shape and ink forming and conditioning process and can remain associated with the ink when packaged or the formed ink may be formed and packaged without such a liner.

The forming tub 110 may further comprise a thermal element (not shown) for controlling the temperature of the forming tub. For instance, the forming tub 110 may be pre-cooled or preheated prior to delivery of molten ink material to the cavity 114 of the forming tub 110. The internal surface of the cavity 114 of the forming tub 110 may be preheated to a temperature, for example, that is approximately equal to the delivery temperature and/or the melt temperature of the ink material. Such preheating of the forming tub 110, which can include any liner that might be used, prevents overly rapid cooling of the exterior surface of ink material relative to the interior which may result in shrinking and/or cracking of the surfaces of the ink stick.

Figure 17:
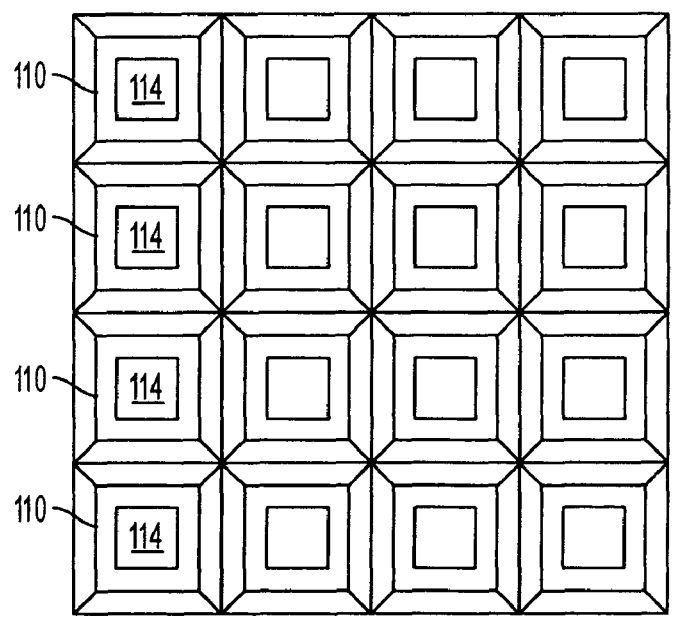
FIG. 17 is a top view of an array of forming tubs on a tub transport.

The forming tubs 110 may be detachably affixed to the tub transport 116. The tub transport comprises a conveyance system that operates to convey a forming tub from the molten ink dispensing station to a position in operative relationship with the top surface conditioning station. As shown in FIG. 17, a plurality of forming tubs 110 may be attached to the tub transport 116 in lateral rows and additional rows may then be spaced longitudinally along the tub transport 116 to form an array. Four molds are shown in the lateral row of the array of molds in FIG. 17 though more or fewer molds may be used.

Once the forming tubs 110 have been attached to the tub transport 116, the transport 116 advances a first tub 110 (or row of tubs) into position underlying the molten ink delivery station 104. The molten ink delivery station 104 comprises a molten ink reservoir or hopper 120 for holding the molten ink and one or more ink dispensers 124 for dispensing the molten ink 108 from the hopper 120 into one or more forming tubs 110 on the tub transport 116. The molten ink hopper 120 may include a heating element (not shown) for maintaining the ink in the hopper 120 in a molten state. The ink dispensers 124 operate to dispense a predetermined amount of molten ink into a forming tub 110. The molten ink may be gravity fed through an opening in the ink dispensers although any suitable method of dispensing the ink into the forming tubs may be used. In general there are provided as many dispensers 124 as there are forming tubs 110 in a lateral row of forming tubs as shown in FIG. 17, and are arranged over the tub transport 116 so that one dispenser 124 is in a position to fill each forming tub 110 in the row. In one embodiment, the ink is dispensed into a tub through the open top of the tub. The dispensers 124 may be surrounded by a thermally insulated sheath (not shown) in order to prevent the molten ink from solidifying prematurely in the dispenser 124.

The tub transport 116 is configured to allow a row of forming tubs 110 to remain in position underlying the molten ink delivery station 104 for a predetermined dwell time to allow the predetermined amount of molten ink 108 to be dispensed into the cavity 114 of the forming tub 110. Alternatively, ink may be dispensed into the cavity of the forming tub through openings that may be provided in other surfaces of the tub. For example, an opening, such as a one-way valve or the like, may be incorporated into a side surface of the forming tub through which ink may be introduced into the forming tub. Once the molten ink 108 has been introduced into the forming tubs 108, the tub transport 116 conveys the forming tubs 108 to the top surface conditioning station 112. In some embodiments, the top surface conditioning station 112 may be spaced far enough apart from the molten ink delivery station 104 so that a desired degree of cooling and solidification of the dispensed ink material can occur before the forming tub 110 reaches the top surface conditioning station 112.

A thermal control station 128 may be provided adjacent the tub transport 116 between the molten ink delivery station 104 and the top surface conditioning station 112 as shown in FIG. 14. The thermal control station promotes uniform solidification of the ink material in the forming tubs by controlling the extraction of heat from the ink material. In one embodiment, the thermal control station 128 may comprise one or more cooling tunnels for circulating air over the exterior surfaces of forming tubs for accelerating cooling of the top surface of the ink material as well as ink material adjacent to the surfaces of the cavity of the forming tubs. Alternatively, the thermal control station 128 may operate to slow the cooling of the ink material 108 in the forming tubs 110 depending on the desired level of solidification of the ink material prior to reaching the top surface conditioning station 112. In another embodiment, the thermal control station may operate to cool the ink material until it has substantially solidified, and then heat the top surface of the ink material so that the ink material at the top surface is malleable in preparation for conditioning by the top surface conditioning station. For instance, the thermal control station may include a heat lamp for heating the top surface of the solidified ink material. The malleability of the top surface is determined by the duration and intensity of the heat from the heat lamp. Maintaining a non solidified state may be desired for forming and the addition of external heat may be beneficial. As example, it may be desirable to influence top surface flatness, form topography and/or create marks or symbols before the ink cools sufficiently to become solid or semisolid. The forming plate in this case would be lowered sufficiently into the still molten or semi-molten ink to cause the ink to take the shape of the plate area in contact as the ink solidifies. Heating, if used, would be terminated and a cooling influence might be employed to speed the process of shape solidification. Suitable delay or dwell time may be required to ensure retention of the forming imposed on the ink, even if the form tool is cooled. Internal form tool cooling and/or external low friction release agent or a coating, such as PTFE, may be needed to prevent the ink from sticking to the forming plate as the ink solidifies. Additionally, topographical features and symbol markings would benefit from drafted or angled "walls" to facilitate tool separation.

In an alternative, once the molten ink 108 has been introduced into the forming tubs 108 and the desired degree of cooling and solidification has occurred, the tub transport 116 conveys the forming tubs 110 to the surface conditioning station. As used herein, conditioning may mean creating or obtaining a predetermined contour or surface property of a top surface of the ink stick such as, for example, by pressing a solid member against a portion of a surface of the ink material in the forming tub; placing a solid member on or near a portion of the surface to be conditioned; applying a liquid or vapor to the top surface; and/or applying radiant energy of any kind to the top surface. Although the term "top surface" is used herein for clarity, it will be understood that no absolute relation to the direction of gravity is implied. Additionally, the ink stick surface that becomes the "top" in use may be the most complex or feature laden and may benefit from being formed at the bottom or one of the sides of the tub.

Figure 18:
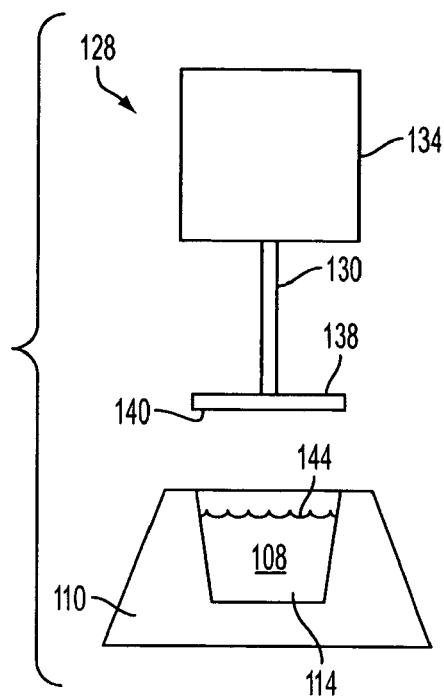
FIG. 18 is a side schematic view of a forging section of the top surface conditioning station of FIG. 14 in the non-forging position.

As shown in FIG. 18, in one embodiment, the top surface conditioning station 112 includes a forging section 128 for applying pressure to the top surface of the substantially solidified ink material to smooth and controllably form the top surface of the ink. In one embodiment, the top surface would be substantially flattened. In another embodiment, the top surface might be altered with a desired three dimensional topography, which could include feed keying, sensor feature(s) or other elements. In both cases the object is to control shape and achieve consistent height and profile geometry of the ink sticks.

Figure 19:
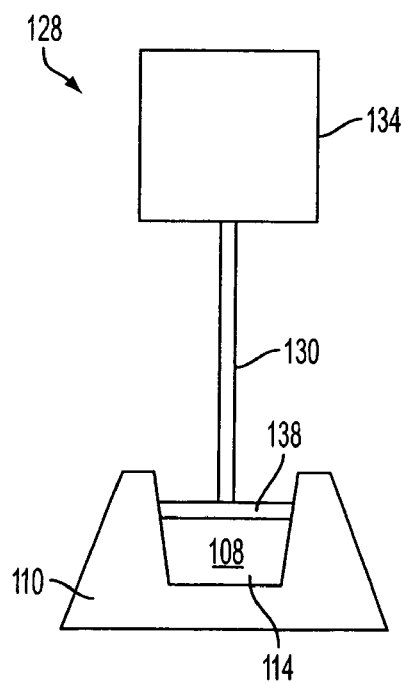
FIG. 19 is a side schematic view of a forging section of the top surface conditioning station of FIG. 14 in the forging position.

Referring to FIGS. 18 and 19, the forging section 128 comprises at least one forging member 130 and a forging member driver 134. The forging member 130 may be slidably mounted in a position to perpendicularly engage the top surface 144 of the ink material in the forming tub 110. The forging member 130 may include a press plate 138 at the end of the forging member 130. The press plate 138 may have a substantially flat contact surface 140 that is sized to flushly engage the top surface 144 of the ink material through the open top of the cavity 114 of the forming tub 110. The forging member driver 134 drives the forging member 130 from an open or non-forging position shown in FIG. 18 to a closed or forging position in FIG. 19 in which the contact surface 140 of the press plate 138 engages the top surface 144 of the ink material. The top surface of the ink material should be substantially solidified before the press plate contacts the top surface. If the ink material is not sufficiently solidified, the ink material may stick to the press plate after it is removed. Alternatively, the press plate may be of a low friction material or be treated with a releasing agent to reduce the likelihood of ink material sticking to the plate. Thermal control, including heating and/or cooling, of the press plate may be used to facilitate the forming process, release process or both. This could be done exclusive of or in addition to thermal control of the tub and/or ink before, during or after the forming process.

The forging section 128 may be comprised of a compression press which includes a pressure regulator for regulating the pressure delivered to the top surface of the ink material. The forging member 130 may be configured to have a sudden impact on the substantially solidified ink material in the forming tub 110. Alternatively, the forging member 130 may have slow motion or delayed dwell while in the molding position. When the forging member 130 engages the top surface 144 with a delayed dwell time, the forging member 130 may be used to thermally influence the ink material to further control the solidification state. To this end, the forging section 128 may further comprise a press plate heater (not shown) capable of controlling the temperature of the press plate 138. For instance, the press plate heater may control the temperature of the press plate 138 so that it is cooled relative to the ink material in the forming tubs 110 to encourage further solidification of the top surface 114 of the ink material, or alternatively, the press plate 138 may be heated to ensure that the top surface forms as a relatively flat plane.

In another embodiment, the forging section may be configured to mark the top surface of the ink material in the forming tub. To this end, the contact surface 140 of the press plate 138 may have protrusions and indentations that correspond to the shape of the mark. The mark may comprise any human-readable or machine-readable data, such as, for example, serial numbers, tracking numbers, barcodes, etc., as well as company logos, trademarks, etc. As shown in FIGS.

10-13, the mark may comprise one or more alphanumeric characters such as the numerals "1", "2", "3" or "4".

Although the press plate has been described as being attached to a driver such as a compression press, other methods of engaging the top surface of the ink material in the forming tubs with the press plate are contemplated. For instance, the press plate may be configured such that the weight of the press plate provides the compressing force. In this embodiment, the press plate may be placed over the open top of the forming tub and left in position or a specified time before being subsequently removed. The tub may alternative be lifted into contact with a plate. In another embodiment, the press plate may be incorporated into the forming tub itself. For instance, the press plate may be connected to the tub by a hinge or other suitable attachment method, and a device or mechanism may be operable to move the attached press plate to essentially "close" the top of the forming tub for a predetermined dwell time. The device or mechanism for "closing" the incorporated press plate may be configured to apply pressure to the press plate as described above. Moreover, the engagement of the incorporated press plate to the top surface of the ink material may be sudden impact or delayed dwell, and the incorporated press plate may be "opened" or subsequently removed, automatically or manually, from the top surface of the ink material in the forming tub. Additionally, in embodiments of the press plate in which the weight of the press plate provides the compressing force and in embodiments of the press plate which are incorporated into the forming tub, the respective press plates may include protrusions and indentations for imparting a visually recognizable symbol to the top surface of the ink material in the cavity of the forming tubs.

In embodiments of the top surface conditioning station 112 that incorporate forging, the top surface conditioning station may further include a cleaning section (not shown) for removing any residual ink material left on the plates after use. The cleaning station may be included in the forging section. For instance, the pressing or forging section may include one or more cleaning blades or brushes and drivers for controlling the motion of the blades or brushes and/or a blast of controlled temperature gas can be used for cleaning. In this embodiment, the plates may be cleaned in place in their respective sections. Alternatively, the cleaning station may be positioned adjacent the forging section. In this embodiment, the pressing or forging plates are moved from the non-forging position to the cleaning position by the forging member driver. Once in the cleaning position, the plates are cleaned by one or more cleaning devices in the cleaning station and then returned to the non-forging position. Alternatively, any cleaning method may be used that is suitable for cleaning and removing residual ink material from a pressing or forging plate. Moreover, cleaning of the plates may be done after each forging operation or at various intervals or based on optical or visual inspection of the plates or the surfaces of the forged ink. The form plate cleaning operation described may be applicable to the forming method of impressing the plate into non solidified ink where forming occurs as the ink solidifies.

Although the forging section and/or thermal control station have been described as being substantially separate from the ink delivery station, the forging and/or thermal control process may be incorporated into the molten ink delivery station. For instance, molten ink delivery station may be performed in a chamber configured to impart the desired level of cooling or heating to the dispensed ink without having to transport the forming tubs to another location. Similarly, a press plate may be incorporated into the ink delivery station that may be moved from an inoperative position to an operative position while the forming tubs remain in the molten ink delivery station. Final forming of an ink stick may involve a post process step such as milling, drilling, sawing, melting or other such fabrication or modification technique. Some features may be best formed in one or more steps where material is removed. Controlled surface melting might be employed to soften sharp edges or to attain a particular level of sheen, color blend or similar aesthetic improvement. Such steps would more likely be performed on the exposed ink surface while in the tub but could be done on any surface at a station or phase prior to packaging.

Figure 20:
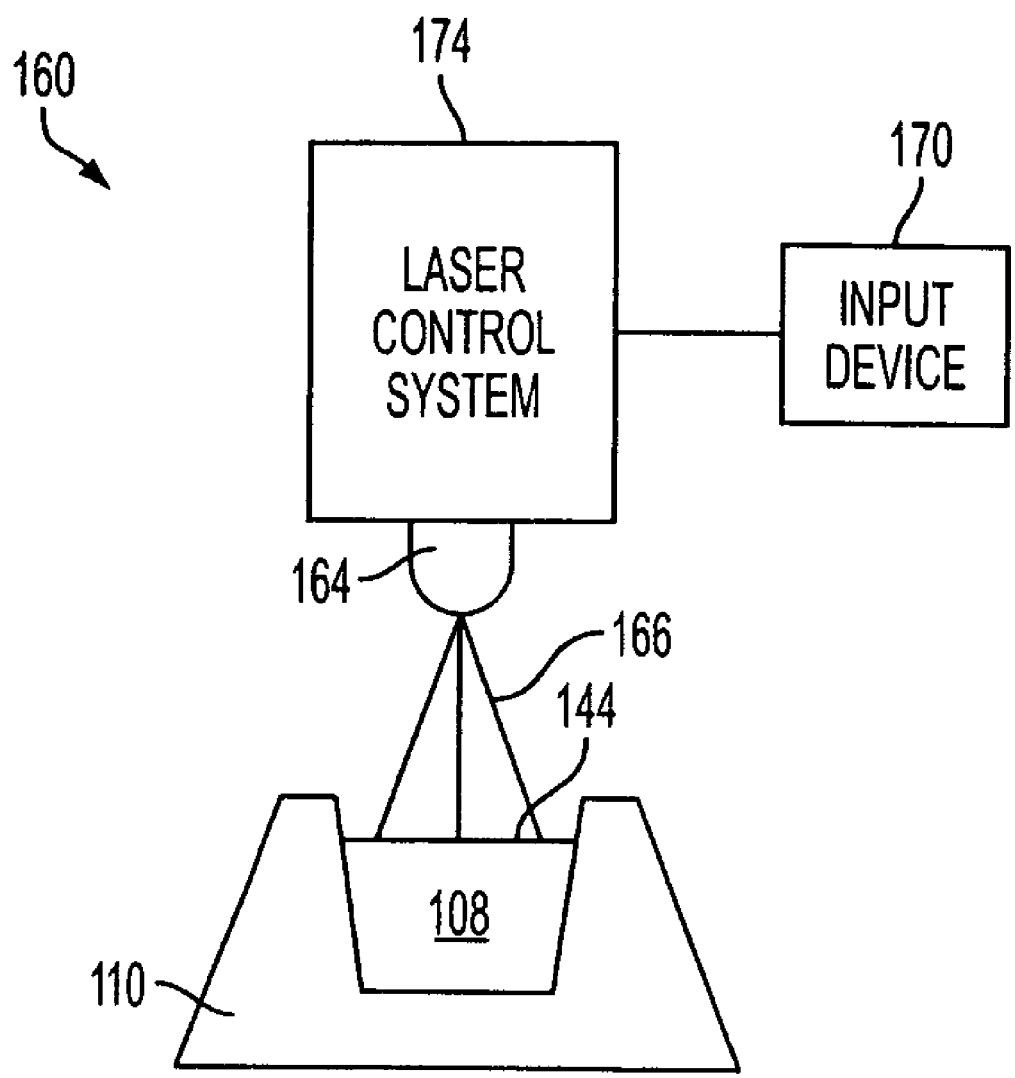
FIG. 20 is a schematic view of a laser writing station of the top surface conditioning station of FIG. 14.

Referring to FIG. 20, the top surface conditioning station 112 may comprise a laser writing station 160 for marking the top surface 144 of the ink material 108 in the forming tubs 110. The laser writing station 160 includes a laser 164 for providing a laser beam 168 that may be used to ablate the top surface 144 of the ink material 108 in the forming tubs 110. The laser of the type employed herein may be a $CO_2$, excimer or other appropriate type. The mode of laser operation may vary, including both continuous wave and pulsed beam generation. $CO_2$ lasers typically operate in the infrared range, having characteristic wavelengths on the order of approximately 10.6 µm, while excimer lasers typically operate in the ultraviolet range, having a characteristic wavelength of less than 300 nm. The specific type of laser to be used is determined by the characteristics of the materials used in the ink composition such as dye or pigment type and the energy characteristics of the laser beam needed to ablate the material or dye.

The laser writing station 160 further includes an input device 170 for providing the pattern data corresponding to the mark to a laser control system 174. The input device 170 may be disk drive that may, in addition to communicating the pattern data to the laser control system 174, also provide permanent storage for the data. The input device 170 may also be a keyboard, a joystick, a light pen, a tape drive, a local area network (LAN) device or any other device capable of providing the pattern data to the laser control system 174. The pattern data is comprised of one or more sets of two-dimensional coordinate information that specify the movement or movements of the laser beam 168 that are necessary to establish the mark on the top surface 144 of the ink material 108 in the forming tubs 110.

The laser writing station 160 further comprises a laser control system 174 for moving the laser beam 168 according to the pattern data provided by the input device 170. The laser control system 174 receives the pattern data for the mark and transforms the pattern data coordinates into actual coordinates corresponding to the surface of the ink stick. The control system 174 then guides the laser beam 168 along the actual coordinates. The laser control system 168 may comprise any suitable laser control device or method as is known in the art, such as a CAD/CAM system.

The laser control system 174 controls the depth of the cut or appearance of the ablation made by the laser beam 168 during the movements specified by the pattern data. The depth of the material removed by the laser 164 is controlled by varying the intensity of the laser beam 168 or the speed of it motion or the number of times it repeats its motion path or any combination of these variables. Additionally, if pulsed, the overlap amount of the beam spot can be varied. If only one thin layer is to be removed, the beam may be set to a low intensity. Removal of a thicker layer of material may require an increase in the intensity or time exposure of the beam. Because the intensity levels and settings required for each particular laser beam are different, specific settings are not disclosed herein.

In use, pattern data for a visually recognizable symbol is input into the input device 170 and communicated to laser control system 174. The pattern data may be input by scanning an image or by typing the pattern data, or both, or any other suitable method for inputting the pattern data. The laser control system 174 may include further systems for modifying the pattern data in a variety of ways after the pattern data is input. For instance, the pattern data may be scaled larger or smaller, or combined with other pattern data in part or in whole to form new pattern data.

The tub transport 116 then moves the forming tubs into the writing station 160 to an operative position in which the marking device(s), such as a laser beam 168 has access to the top surface 144 of the ink material 108. The laser control system 174 moves the laser 164 and adjusts the intensity of the laser beam 168 according to the pattern data received through the input device 170. By controlling the movement and intensity of the laser beam 168 upon the top surface, various configurations may be ablated. Additionally, by controlling the dwell time or rate of scan of the laser beam 168 upon the top surface 144 of the ink material, various depths of ablation may be attained. The depth of ablation may also be controlled by repetitive scans, rather than single scans at increased dwell time.

Impingement of the laser beam 168 upon the top surface 144 of the ink material causes some of the material to evaporate or vaporize, while leaving particulate ink material on the top surface 144. This particulate ink material must be cleared from the top surface 144 so the laser 164 may impinge upon an unobstructed area. Accordingly, the laser writing station 160 may further include a debris cleaning system (not shown) such as a vacuum exhaust. Alternatively, any known or suitable method or device for removing laser debris from a work area known in the art may be employed. The laser marking may be less material removal than localized melting or moderate ablation so as to create the visually recognizable symbols with more of a two dimensional appearance. Two dimensional symbols may also be created by rolling or stamping ink, ink components or contrasting material. Any described or similar alternative marking methods may be used individually or in any combination. The laser has the advantage of easily enabling writing of consecutive serial numbers or other short duration marking such as selecting a SKU from a range of SKUs.

Although the system 100 has been described as having various sections and/or stations through which ink sticks may be routed, the system 100 may be configured such that the ink sticks remain stationary and the various processing steps are performed in situ. Additionally, top surface conditioning may be performed on ink sticks that have been formed using other manufacturing methods or have undergone other processing steps. For instance, ink sticks may be formed by extrusion, co-extrusion, injection molding, etc. and then subjected to the top surface conditioning process of the present disclosure.

Moreover, those skilled in the art will recognize that various configurations of stations and sections described above are possible. For instance, the press plate of the depression section may be provided with marking features protruding or inset into the press plate to obviate the need for a separate forging step. Laser writing may be added to any altering step or may be used alone. Those skilled in the art, upon reading this description will recognize that a variety of modifications may be made to the shapes of the ink sticks without departing from the spirit of the present disclosure. For example, different numbers of nesting elements may be included on the end surfaces of the ink sticks. In addition, the visually recognizable symbol can be any of a variety of shapes, such as animals, playing card symbols, model numbers, etc. Therefore, the following claims are not limited to the specific embodiments described and shown above.

What is claimed is:

1. A system for forming solid ink sticks comprising:
    a molten ink delivery station configured to introduce molten ink material into a forming tub to form a solid ink stick, said forming tub including an open top and a cavity for receiving the molten ink, the cavity defining at least a lower portion of a solid ink stick shape;
    a thermal control station configured to cool the ink material introduced into the cavity of the forming tub until the ink material has solidified in the cavity and the thermal control station being configured to heat a top surface of the solidified ink material exposed through the open top of the forming tub;
    a laser writing station having a laser that is configured to ablate a top surface of the ink material in the forming tub;
    a tub transport configured to move the forming tub with the ink material from the molten ink delivery station to the thermal control station before moving the forming tub to a position opposite the laser writing station;
    a laser control station configured to receive pattern data and to move the laser of the laser writing station to scan repetitively the top surface of the ink material in the forming tub in a pattern corresponding to the received pattern data to control a depth of ablation for a mark formed in the top surface of the ink material in the forming tub with the laser, the pattern data corresponds to data pertaining to the ink stick in which the mark was formed; and
    the laser control station being further configured to modify the pattern data in response to a next forming tub arriving at the forming tool and to control movement of the laser with reference to the modified pattern data to form a mark in the top surface of the ink material exposed through the open top of the next forming tub that corresponds to modified data pertaining to the ink stick in which the mark was formed.

2. The system of claim 1, wherein the laser control station moves the laser of the laser writing station to scan repetitively the top surface of the ink material with the laser to mark data pertaining to an ink stick in the top surface of the ink material.

3. The system of claim 1, wherein the laser control station moves the laser of the laser writing station to scan repetitively the top surface of the ink material to form a visually recognizable symbol in the top surface of the ink material.

4. A method of forming solid ink sticks comprising:
    introducing molten ink material into a cavity of a forming tub at a molten ink delivery station;
    moving the forming tub from the molten ink delivery station to a thermal control station;
    cooling the forming tub until the molten ink in the forming tub solidifies;
    heating the solidified ink in the forming tub through an open top of the forming tub;
    moving the forming tub from the thermal control stations to a position opposite a laser writing station;
    controlling movement of a laser at the laser writing station in accordance with pattern data to scan repetitively a surface of the ink material in the forming tub to form a mark in the surface of the ink material that corresponds to the pattern data;
    modifying the pattern data with the laser writing station;
    controlling movement of the laser with reference to the modified pattern data to form a modified mark in the surface of the ink material in a next forming tub moved to the position opposite the laser writing station; and continuing to modify the pattern data in response to a next forming tub arriving at the laser writing station and controlling movement of the laser with reference to the modified pattern data to form a series of modified marks in the surfaces of the ink material in a series of forming tubs delivered to the laser writing station.

5. The method of claim 4, wherein the mark formed in the surface of the ink material is a visually recognizable symbol formed in the surface of the ink material.

6. A system for forming solid ink sticks comprising:

a molten ink delivery station configured to introduce molten ink material into a forming tub to form a solid ink stick, said forming tub including an open top for receiving said molten ink material and a cavity defining a lower portion of a solid ink stick shape;

a thermal control station configured to cool the ink material introduced into the cavity of the forming tub until the ink material has solidified in the cavity and the thermal control station being configured to heat a top surface of the solidified ink material exposed through the open top of the forming tub;

at least one forming tool having a laser that is configured to ablate the top surface of a solidified ink stick in the forming tub, the top surface of the solidified ink stick being exposed through the open top of the forming tub;

a tub transport configured to move the forming tub with the ink material from the molten ink delivery station to the thermal control station and then move the forming tub from the thermal control station to the forming tool;

a laser control station configured to receive pattern data and control movement of the laser to enable the laser to scan repetitively the top surface of the solid ink stick exposed through the open top of the forming tub in a pattern corresponding to the received pattern data to control a depth of ablation for a mark formed in the top surface of the solid ink stick with the laser, the pattern data corresponds to data pertaining to the ink stick in which the mark was formed; and the laser control station being further configured to modify the pattern data in response to a next forming tub arriving at the forming tool and to control movement of the laser with reference to the modified pattern data to form a mark in the top surface of the ink material exposed through the open top of the next forming tub that corresponds to modified data pertaining to the ink stick in which the mark was formed.

7. A system for making solid ink sticks comprising:

a molten ink delivery station configured to introduce molten ink material into a forming tub to form a solid ink stick, said forming tub including an open top and a cavity for receiving the molten ink material, the cavity defining at least a lower portion of a solid ink stick shape;

a thermal control station configured to cool the ink material introduced into the cavity of the forming tub until the ink material has solidified in the cavity and the thermal control station being configured to heat a top surface of the solidified ink material exposed through the open top of the forming tub;

a laser configured to generate a laser beam that ablates a top surface of the solidified ink material in the forming tub;

a tub transport configured to move the forming tub from the molten ink delivery station to the thermal control station and then from the thermal control station to a position opposite the laser; and a laser control station configured to receive pattern data that corresponds to data pertaining to the ink stick in which the mark was formed, to control movement of the laser to enable the laser to scan repetitively the top surface of the ink material in a pattern corresponding to the received pattern data to control a depth of ablation for a mark formed in the top surface of the ink material with the laser beam, and to modify the pattern data in response to a next forming tub arriving at the forming tool and to control movement of the laser with reference to the modified pattern data to form a mark in the top surface of the ink material exposed through the open top of the next forming tub that corresponds to modified data pertaining to the ink stick in which the mark was formed.

8. The system of claim 7 wherein the laser is a carbon dioxide laser or an excimer laser.

9. The system of claim 7 wherein the pattern data correspond to a visually recognizable symbol.

10. A system for forming solid ink sticks comprising:

a molten ink delivery station configured to introduce molten ink material into a forming tub to form a solid ink stick, said forming tub including an open top and a cavity for receiving the molten ink, the cavity defining at least a lower portion of a solid ink stick shape;

a thermal control station configured to cool the ink material introduced into the cavity of the forming tub until the ink material has solidified in the cavity and the thermal control station being configured to heat a top surface of the solidified ink material exposed through the open top of the forming tub;

a laser writing station having a laser that is configured to ablate a top surface of the solidified ink material in the forming tub;

a tub transport configured to move the tub from the molten ink delivery station to the thermal control station and to move the tub with the solidified ink material to a position opposite the laser writing station; and a laser control station configured to receive pattern data and to move the laser writing station in a pattern corresponding to the received pattern data to ablate a portion of the top surface of the solidified ink material that is exposed through the open top of the forming tub to mark data pertaining to an ink stick in the top surface of the ink material; and the laser control station is further configured to modify the pattern data to enable the laser of the laser writing station to form consecutive serial numbers in the top surface of the ink material in a sequence of tubs transported to the laser writing station.

* * * * *